Sept. 19, 1939.  F. RIEDENER  2,173,637
DEVICE FOR THE ASEPTIC TREATMENT OF THE ROOT OF A TOOTH
Filed June 1, 1937
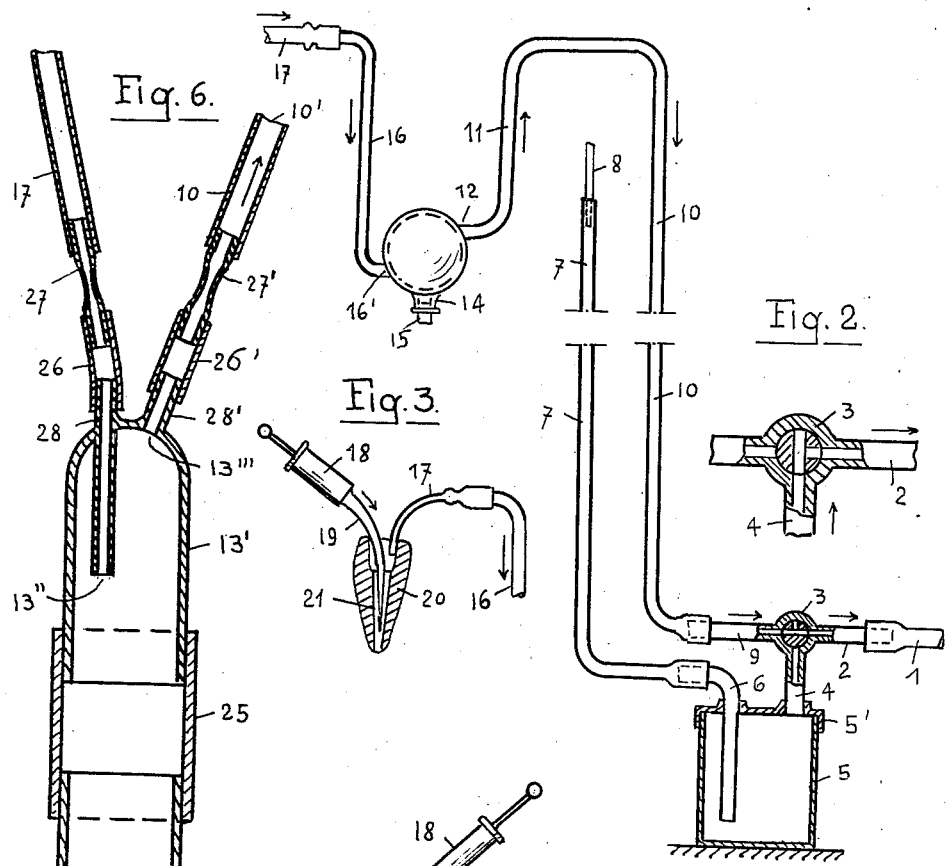
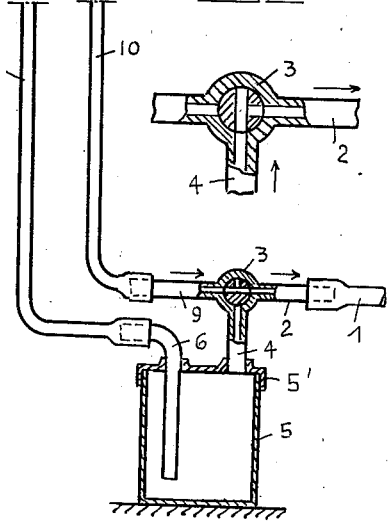
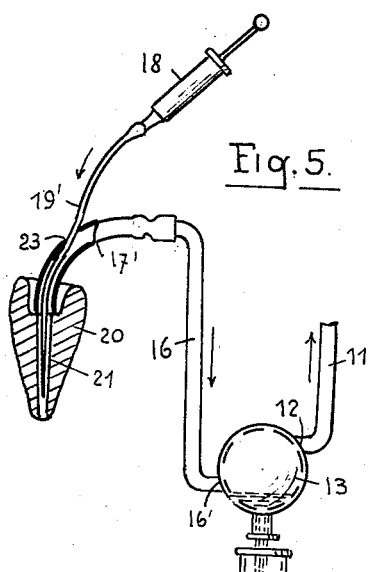
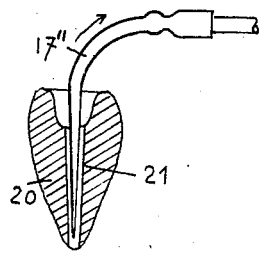
INVENTOR.
Franz Riedener
By Arthur M Hahn
ATTY.

Patented Sept. 19, 1939

2,173,637

UNITED STATES PATENT OFFICE 2,173,637

DEVICE FOR THE ASEPTIC TREATMENT OF THE ROOT OF A TOOTH

Franz Riedener, Zurich, Switzerland

Application June 1, 1937, Serial No. 145,892
In Switzerland May 13, 1936

3 Claims. (Cl. 128—276)

The present invention relates to a dentist's device for aseptically treating the root of a tooth, and the objects of my improvements will become apparent from the following description.

An example of design of the device according to my present invention is illustrated in the accompanying drawing, in which—

Fig. 1 is an elevation of the device, partly in section;

Fig. 2 shows the three-way cock according to Fig. 1 in section and in a different position;

Figs. 3, 4 and 5 show parts of the device with the tooth to be treated, the latter in section; and Fig. 6 shows a variation of a detail.

I is the end of a piece of hose or flexible tubing which at its other end (not shown) is connected to a vacuum-chamber. The said end I is connected to a short piece of pipe 2 which latter forms part of a three-way cock 3. The said cock also is connected to a vessel 5 by means of a short piece of tube 4 passing through a hole in the cover plate 5'. The latter plate may, e. g., be screwed onto the said vessel 5 so as to seal the latter hermetically. A third piece of tube 9 connects the said cock with a piece of hose 10, and the other end of the latter is connected to a downwardly extending pipe 11 which passes into the upper part of a vessel 13. The latter, and also the said pipe 11 suitably is made of glass. The latter vessel is provided with a drain comprising, e. g., a neck piece 14 plugged by a cork 15. A piece of pipe 16 connects the lower part of the said vessel 13 with any of the following pieces of hose: 17 in Fig. 1 and Fig. 3, 17' in Fig. 5, and 17" in Fig. 4.

Through the cover 5' of the vessel 5 a second piece of tube 6 is passing down to immediately above the bottom of the said vessel. The upper end of the tube 6 is connected to a piece of hose 7 at the upper end of which a variety of different pipes (such as 8 in Fig. 1) may be attached.

18 in Fig. 3 denotes a syringe (e. g. a so-called "Record Syringe" widely used by dentists) provided with a bent piece of pipe 19 tapering down to a fine point.

The vessel 13 in Fig. 5 is drained into a second vessel 22, and the piece of tube 17' attached to the upper end of the pipe 16 is bent over. The said tube 17', furthermore, possesses an opening 23 into which the piece 19' of the syringe 18 is projected and extended downwardly into the channel 21 of the tooth 20.

The device functions as follows:

With the cock 3 occupying the position according to Fig. 1, the liquid surrounding the mouth of the tube 17, 17' or 17" is sucked into the vessel 13 and rises in the latter up to the level of the orifice 12. This liquid may be drained off (see Fig. 5) for a bacteriological examination.

With the cock 3 occupying the position shown in Fig. 2, the part 8 is subject to a suction. If this part 8 is put down in a place in which a tooth is being drilled, the loosened material is sucked off and precipitated on the bottom of the vessel 5.

The practical uses of this device are, e. g., as follows: According to Fig. 3 the part 19 of the syringe is lying in the root-channel of the tooth 20. The orifice 17 of the tube 16 is lying in the upper part of the crater. If now we inject a liquid from the syringe into the tooth-channel for the purpose of cleaning the latter, and if the cock 3 is set as shown in Fig. 1, the rinsing liquid flows into the vessel 13, and may be drained for the purpose of a bacteriological examination and the like.

According to Fig. 4 the liquid remaining in the tooth-channel, after the latter has been rinsed, is sucked off into the vessel 13 by way of the tube 17", the cock 3 occupying the position according to Fig. 1.

According to Fig. 5 bacteriological examinations of the tooth-channel 21 may be made by placing the orifice of the tube 17' so onto the crater-opening that practically an air-tight connection is provided, for which purpose the said orifice suitably is provided with a slight taper. If now we rinse the channel by means of the syringe 18 and the projection 19', the rinsing liquid again is being sucked into the vessel 13—with the cock 3 occupying the position according to Fig. 1—and may be drained for the purpose mentioned.

By means of the device described we attain a very pronounced circulation of the rinsing liquid and thus assist the mechanical cleaning action.

The device described, in spite of its wide field of use, is extremely simple in construction and design, and may be cheaply manufactured.

The variation of detail as illustrated in Fig. 6 comprises an open glass-cylinder 13 containing a gelatine solution for the purposes of a bacteriological examination of the rinsing liquid. The said cylinder is connected with a glass-cap 13' by means of a piece of rubber hose 25. 28 is a small glass pipe fused into the said cap 13', possessing a short upper projection and a somewhat extended lower orifice 13". 28' is a second piece of glass pipe fused into the said cap 13' with a short upper projection. 26 and 26' are pieces of rubber hose; 27 and 27' are glass pipes; and 10 and 17 are again pieces of rubber hose.

When using this part of the device, the hose 10 is connected to the vacuum-chamber, and the suction-orifice is connected to the hose 17. This aggregate thus is taking the place of the former vessel 12, 13, 14, 15 and 16'. Under the influence of the vacuum the rinsing liquid is sucked through the hose 17, the glass-pipe 27 and the hose 26 in the direction of the arrow (Fig. 6), and flows into the vessel 13 through the orifice 13". The glass pipes 27 and 27' then are melted in their centers, and the hermetically sealed device, including contents, is ready for being shipped to the laboratory. In the meantime a similar device may be used anew. It is obvious that such devices, after having been used once, may be emptied and sterilized and used over again; the only parts which have to be replaced are the glass pipes 27 and 27'.

What I claim and desire to secure by Letters Patent is:

1. In the aseptic treatment of the cavity of a tooth, a unitary vacuum device for withdrawing and collecting drill dust and liquids from the field of operation, comprising a source of vacuum, a closed receptacle in communication with said source of vacuum for the collection of drill dust in a dry state, a conduit leading into said receptacle, a suction nozzle on the free end of said conduit adapted to be applied to the cavity of the tooth, a second conduit in communication with said source of vacuum, a suction nozzle on the free end of said conduit adapted to be applied to the cavity of the tooth, a second closed receptacle interposed in said second conduit for the collection of liquid, and valve means mounted in said first conduit for selectively controlling the suction to said nozzles.

2. In the aseptic treatment of the cavity of a tooth, a unitary vacuum device for withdrawing and collecting drill dust and liquids, comprising a closed receptacle for the drill dust, a conduit leading from said receptacle to a source of vacuum, a branch line in said conduit, a suction nozzle on the free end of said branch line adapted to be applied to the cavity of the tooth, a closed receptacle interposed in said branch line between said nozzle and said source of vacuum, for the collection of liquids from the tooth cavity, an inlet conduit leading into said first named closed receptacle and extending downwardly therein to a point below the upper extremity thereof, a suction nozzle on the outer end of said conduit adapted to be applied to the cavity of the tooth, and a multiple-way valve interposed between said source of vacuum and said first named conduit for selectively controlling the suction to said nozzles, whereby when said valve is in one position, a suction will be created in said first named nozzle for the removal of drill dust in a dry state from the tooth cavity to said first named receptacle, and when said valve is in another position, suction will be created in said second named nozzle for the removal of liquid from the tooth cavity into said second named receptacle.

3. A receptacle for the deposition of specimen for bacteriological examination of liquids from dental root canals, comprising an elongated vessel open at one end, said vessel forming a chamber adapted for the reception of a gelatine bed, an elongated cover forming a continuation chamber for said vessel and having an opening at one end thereof for alignment with the open end of said vessel, means removably connecting at their adjacent open ends the cover to the vessel, a depository tube on the cover projecting downwardly into said cover, a second tube connected to said cover, said second tube adapted for connection with a source of vacuum, and a tubular glass element connected with each of said tubes, said glass elements being adapted to be sealed.

FRANZ RIEDENER.